United States Patent
Lee

(10) Patent No.: US 6,757,017 B1
(45) Date of Patent: Jun. 29, 2004

(54) APPARATUS AND METHOD FOR AUTOMATICALLY CONTROLLING EXPOSURE TIME IN CMOS IMAGE SENSOR

(75) Inventor: Suk-Joong Lee, Ichon-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/475,223

(22) Filed: Dec. 30, 1999

(30) Foreign Application Priority Data

Dec. 30, 1998 (KR) .......................................... 98-061045

(51) Int. Cl.$^7$ .............................. H04N 3/14; G03B 7/00
(52) U.S. Cl. ...................................... 348/297; 348/362
(58) Field of Search ............................. 348/297, 222.1, 348/362, 363, 364, 234, 235; 396/213

(56) References Cited

U.S. PATENT DOCUMENTS

| | | | | |
|---|---|---|---|---|
| 5,194,960 A | * | 3/1993 | Ota | 348/362 |
| 5,874,994 A | * | 2/1999 | Xie et al. | 348/349 |
| 6,529,242 B1 | * | 3/2003 | Panicacci | 348/308 |

FOREIGN PATENT DOCUMENTS

| | | | | |
|---|---|---|---|---|
| JP | 09065346 | 7/1997 | ............ | H04N/9/04 |
| JP | 11004453 | 6/1999 | ............ | H04N/9/04 |

* cited by examiner

*Primary Examiner*—Wendy R. Garber
*Assistant Examiner*—Paul W. Myers
(74) *Attorney, Agent, or Firm*—Jacobson Holman PLLC

(57) ABSTRACT

A method for automatically controlling an exposure time in a CMOS image sensor includes the steps of a) estimating green pixel values and counting green pixels according to respective predetermined ranges, b) calculating a first total count value and a first maximum count value of green pixels having pixel values greater than a predetermined reference range and a second total count value and a second maximum count value of the green pixels having pixel values smaller than the reference ranges, c) comparing the first total count value with the second total count value, d) comparing a third total count value of the green pixels having a pixel value within the predetermined reference range with the first maximum count value if the first total count value is greater than the second total count value, and comparing the third total count value with the second maximum count value if the second total count value is greater than the first total count value, e) capturing a next image according to a current exposure time control signal if the third total count value is greater, and calculating an exposure control rate and an exposure time control signal and capturing the next image according to the next exposure time control signal if the third total count value is smaller, and f) repeating the steps a) to e) until the final completion of capturing image.

10 Claims, 5 Drawing Sheets

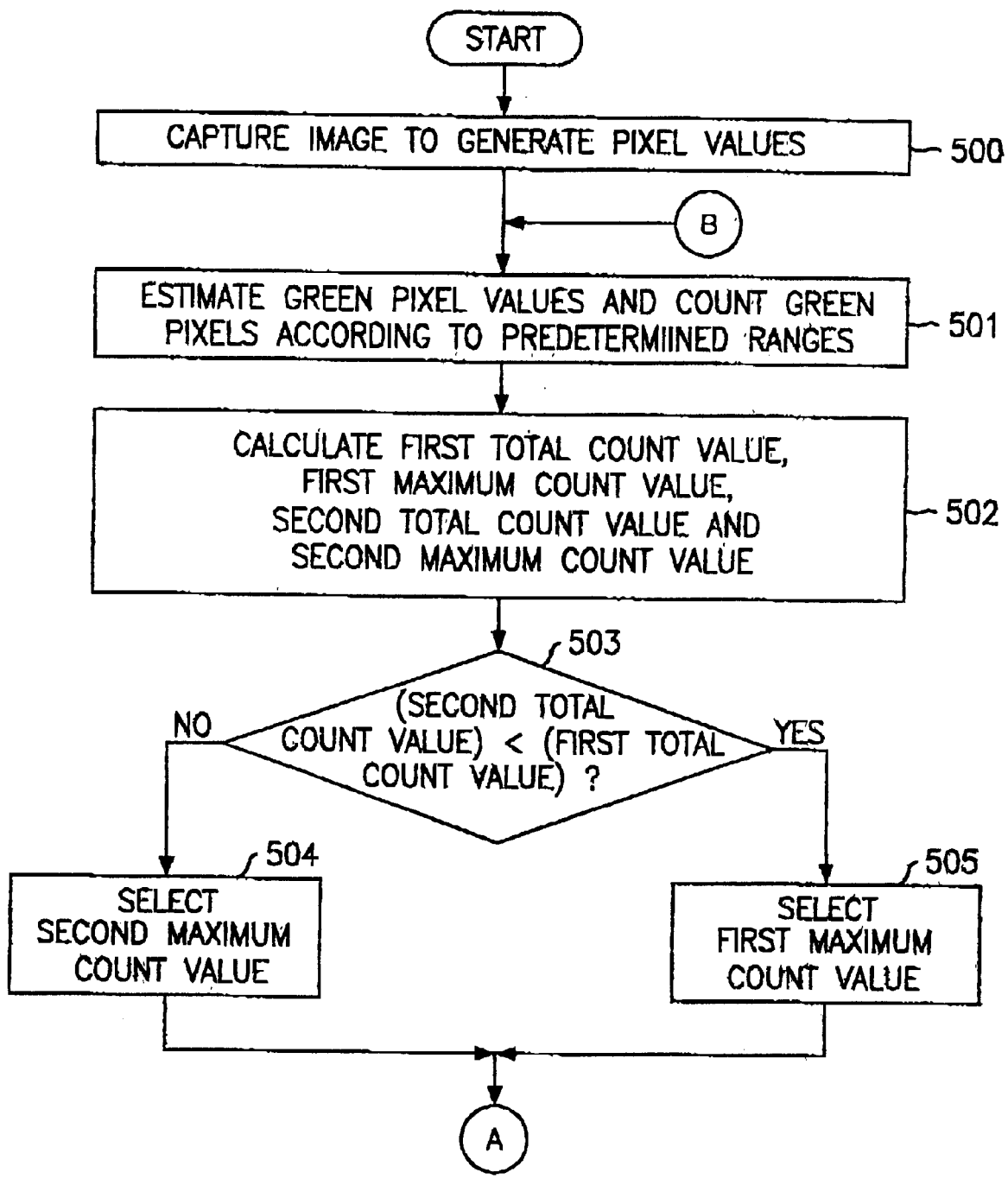

APPARATUS AND METHOD FOR AUTOMATICALLY CONTROLLING EXPOSURE TIME IN CMOS IMAGE SENSOR

FIELD OF THE INVENTION

The present invention relates to a CMOS image sensor; and, more particularly, to an apparatus and method for automatically controlling an exposure time using a counter that counts green pixels according to predetermined ranges, reducing a burden of hardware and software and improving a performance of the CMOS image sensor.

DESCRIPTION OF THE PRIOR ART

A conventional image sensor has controlled an illuminance of image using software. Software calculates a current illuminance using a captured image value. Then, if the calculated illuminance is judged to be very bright or very dark, an external controller adjusts the illuminance of the image. Thereafter, illuminance of the adjusted image is again read to judge the illuminance of the image.

In such a conventional method for controlling illuminance through software, however, the actual judgement of the illuminance is completed after processing at least two images from the image sensor. Therefore, a problem may occur and the software is burdened with an increased amount of calculation. In addition, the calculated results should be again programmed through a programming interface and the programmed results is applied to the image capturing, so that a considerable delay time is required. Furthermore, in case the image sensor is used in such as CCTV (Closed Circuit TeleVision), where it is difficult for software to control the illuminance, it may not cope with the change of situation initially set up.

SUMMARY OF THE INVENTION

It is, therefore, an object of the present invention to provide an apparatus and method for automatically controlling an exposure time using a counter that counts green pixels according to predetermined ranges, reducing a burden of hardware and software and improving a performance of the CMOS image sensor.

In accordance with an aspect of the present invention, there is provided an apparatus for automatically controlling an exposure time in a CMOS image sensor, comprising: a data-estimation means for estimating the green pixel values according to respective predetermined ranges to generate count control signals; a counting means for performing a counting operation in response to the corresponding count control signals, wherein the counting means includes a first counter for counting green pixels having pixel values within a predetermined reference range, a second plurality of counters for counting green pixels having pixel values greater than the predetermined reference ranges according to the respective predetermined ranges, and a third plurality of counters for counting green pixels having pixel values smaller than the predetermined ranges according to the respective predetermined ranges; a first means for adding and comparing count values from the second plurality of counters to generate a first total count value and a first maximum count value; a second means for adding and comparing count values from the third plurality of counters to generate a second total count value and a second maximum count value; a control means for comparing count values of the first counter, the second plurality of counters and the third plurality of counters to generate a update control signal and an exposure control rate; and an exposure time control signal generating means, in response to an exposure control mode signal and the update control signal, for generating a next exposure time control signal.

In accordance with another aspect of the present invention, there is provided a method for automatically controlling an exposure time in a CMOS image sensor, comprising the steps of: a) estimating green pixel values and counting green pixels according to respective predetermined ranges; b) calculating a first total count value and a first maximum count value of green pixels having pixel values greater than a predetermined reference range and a second total count value and a second maximum count value of the green pixels having pixel values smaller than the reference ranges; c) comparing the first total count value with the second total count value; d) comparing a third total count value of the green pixels having a pixel value within the predetermined reference range with the first maximum count value if the first total count value is greater than the second total count value, and comparing the third total count value with the second maximum count value if the second total count value is greater than the first total count value; e) capturing a next image according to a current exposure time control signal if the third total count value is greater, and calculating a next exposure time control signal and capturing the next image according to the next exposure time control signal if the third total count value is smaller; and f) repeating the steps a) to e) until the final completion of capturing image.

BRIEF DESCRIPTION OF THE DRAWINGS

Other objects and features of the present invention will become apparent from the following description of the embodiments with reference to the accompanying drawings, in which:

FIGS. 5A and 5B are flow charts of calculating a next exposure time according to the present invention.

DETAILED DESCRIPTION OF THE PREFERRED EMBODIMENTS

Figure 1:
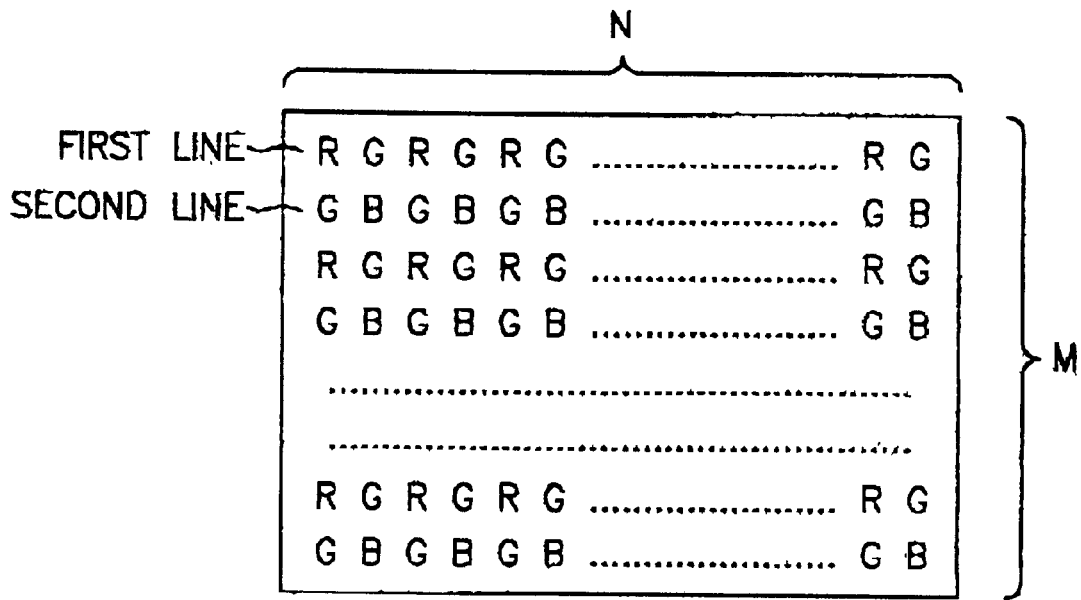
FIG. 1 is a diagram showing an M×N unit pixel array having pixels arranged as a form of a typical Bayer pattern.

FIG. 1 is a diagram showing an M×N pixel array arranged as a form of Bayer pattern. Referring to FIG. 1, a pixel array includes repetitive arrangements of a RGRG type and a GBGB type every odd and even line. Here, "R" represents a red pixel for sensing only a red color, "G" a green pixel for sensing only a green color and "B" a blue pixel for sensing only a blue color.

In the Bayer pattern, the green pixels are two times as many as the red or blue pixels is that the green color greatly affects the illuminance as given in Eq. 1.

$$Y = 0.30R + 0.59G + 0.11B \quad (\text{Eq. 1})$$

where Y is an illuminance, R is a red pixel value, G is a green pixel value and B is a blue pixel value.

According to the Eq. 1, however, all of the red, green and blue pixel values are needed to calculate the illuminance, resulting in an increase of the number of calculation.

Figure 2:
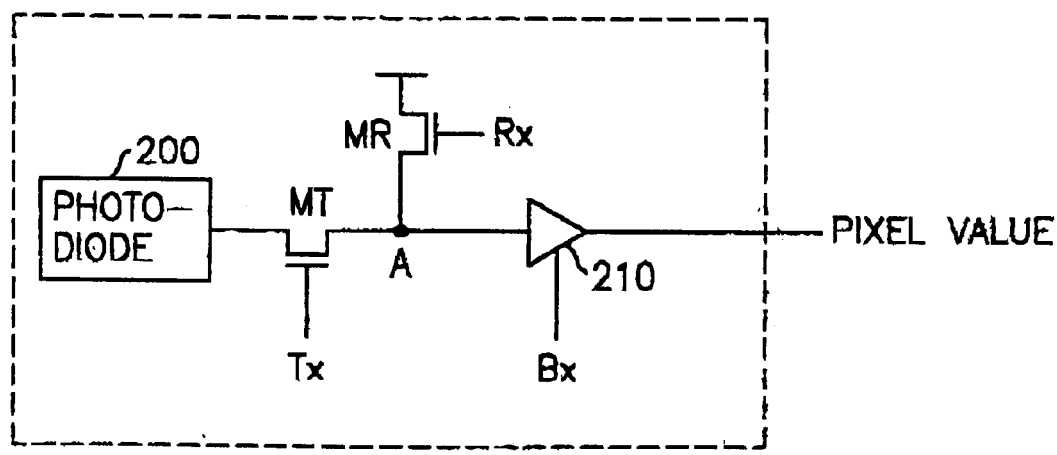
FIG. 2 is a schematic diagram illustrating a pixel contained in pixel array shown in FIG. 1.

FIG. 2 is a typical structure of a pixel contained in the pixel array shown in FIG. 1.

Referring to FIG. 2, the pixel includes a photodiode 200 for receiving light from an object and generating photoelectric charges, a transfer transistor MT, in response to a transfer control signal Tx, for transferring the photoelectric charges to a sensing node Na, a reset transistor MR, in response to a reset control signal Rx, for transferring a reset voltage level to the photodiode 200 and an output buffer 210, and the output buffer 210, in response to a buffer control signal Bx, for outputting the reset voltage level and the output signal of the photodiode 200.

Referring to FIG. 2, an operation of the pixel will be described below.

First, the reset transistor MR and the transfer transistor MT are simultaneously turned on to thereby make a fully depleted region in the photodiode 200. Next, the transfer transistor MT is turned off while the reset transistor MR is kept on a turned-on state, so that the photodiode 200 generates the photoelectric charges.

Then, after turning on the transfer transistor MT, the output buffer 210 outputs the photoelectric charges as a pixel value to an external circuit in response to the buffer control signal Bx. Like typical memory devices, each pixel contained in the pixel array shares the buffer control signal line by line.

Meanwhile, an amount of the photoelectric charges to be accumulated in the photodiode 200 is proportional to a time period during when the transfer transistor MT is kept on a turned-off state in response to the transfer control signal Tx. Therefore, in case where an image is captured in a dark place, the transfer transistor MT should be kept on a turned-off state for a long time, but in case where an image is captured in a bright place, the transfer transistor MT should be kept on a turned-on state for a short time. At this time, the time period when the transfer transistor MT is kept on the turned-off state is called an exposure time or an integration time. Here, a exposure time control signal represents a signal to control the exposure time. Therefore, the illumination can be controlled by the exposure time.

Figure 3:
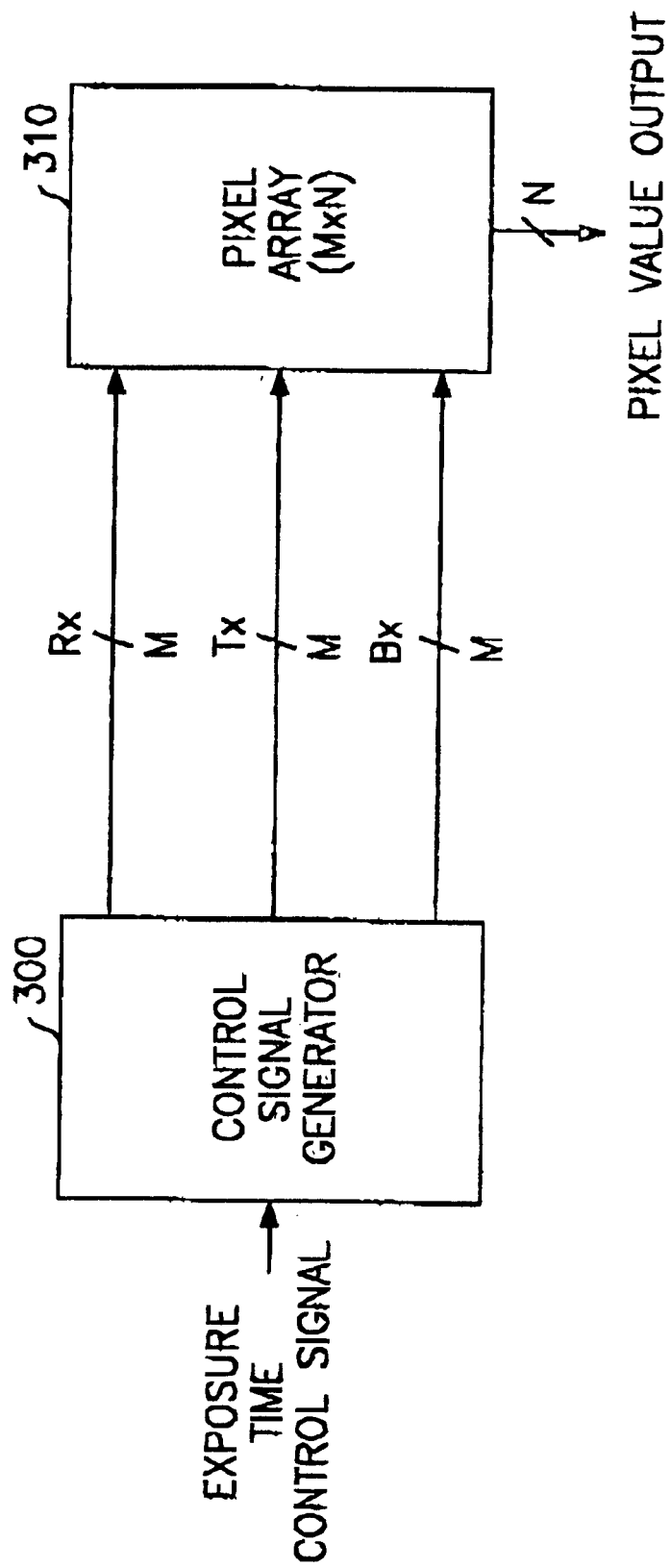
FIG. 3 is a block diagram illustrating an interconnection relationship between a pixel array and a control signal generator.

FIG. 3 is a block diagram showing an interconnection relationship between an M×N unit pixel array and a control signal generator. The control signal generator 300 generates the M numbers of the transfer control signal Tx, a reset control signal Rx and the buffer control signal Bx under a control of an exposure time. The M×N pixel array 310 outputs the N numbers of the pixel values.

Figure 4:
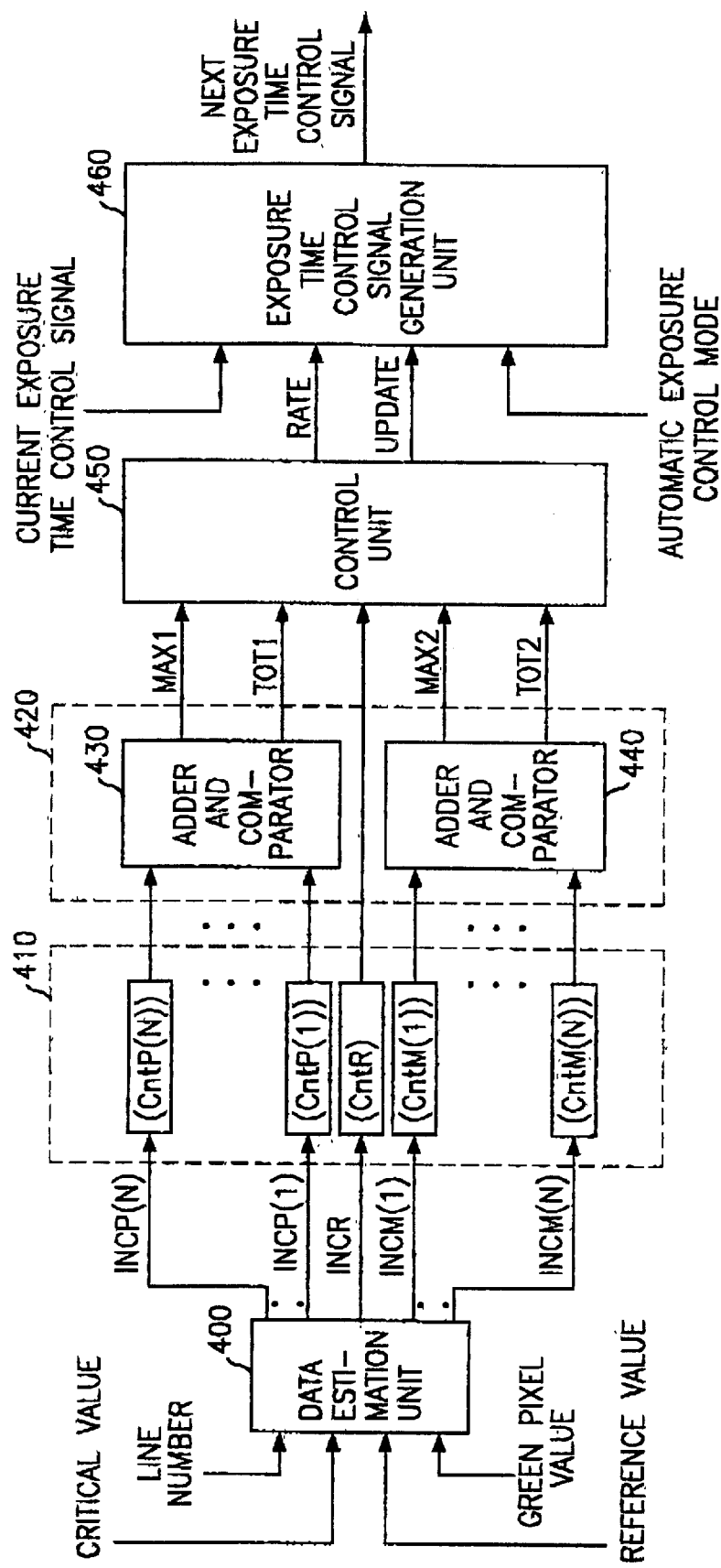
FIG. 4 is a block diagram illustrating an automatic exposure controller in accordance with the present invention.

FIG. 4 shows a block diagram of an automatic exposure controller according to the present invention.

As shown in FIG. 4, the automatic exposure controller includes a data estimation unit 400, a counter unit 410, an addition and comparison unit 420, a control unit 450 and an exposure time control signal generation unit 460.

The data estimation unit 400 receives a line number, a green pixel value, a predetermined critical value and a predetermined reference value, wherein the line number provides line information since a green pixel information of odd lines is different from that of even lines. At this time, a user can program the predetermined reference value and the predetermined critical value so as to control an entire illuminance and flexibly adjust a distribution of the green pixel values, respectively. Further, the data estimation unit 400 estimates the green pixel value to generate count control signals INCP(1) to INCP(N), INCR, and INCM(1) to INCM (N), assigned to each predetermined range, according to the estimated pixel values.

The count control signals are generated according to the following relationship.

If, $(RV+(P-1) \times CV) \leq GV < (RV+P \times CV)$, then corresponding count controls signals INCR, INCP(P) and INCM(P) are generated, where RV is a reference value, GV is a green pixel value, CV is a critical value, and P is a coefficient. At this time, if P is zero, a reference count control signal INCR is generated, and if P is identical to or greater than two, a count control signal INCP(P) is generated, and if P is identical to or smaller than minus one, a count control signal INCM(P) is generated.

The counter unit 410 includes (2N+1) counters CntP(1) to CntP(N), CntR, and CntM(1) to CntM(N). Each count value of the counters increases by one in response to respective count control signals INCP(1) to INCP(N), INCR, and INCM(1) to INCM(N), respectively.

The addition and comparison unit 420 includes a first adder and comparator 430 and a second adder and comparator 440. The first adder and comparator 430 adds and compares respective count values of the counters CntP(1) to CntP(N) to generate a first total count value TOT1 and a first maximum count value MAX1. In similar manner, the second adder and comparator 440 adds and compares respective count values of the counters CntM(1) to CntM(N) to generate second total count value TOT2 and a second maximum count value MAX2. At this time, the first adder and comparator 430 represents a positive distribution of the green pixels and the second adder and comparator 440 represents a negative distribution of the green pixels. That is, if the first total count value TOT1 is greater than the second total count value TOT2, it means that current illuminance is brighter than a reference illuminance, and if the second total count value TOT2 is greater than the first total count value TOT1, it means that current illuminance is darker than the reference illuminance.

The control unit 450 compares the first total count value TOT1 with the second total count value TOT2 to generate an exposure control rate RATE. For example, when the first total count value TOT1 is greater than the second total count value TOT2, the count value of the reference counter CntR is compared with the first maximum count value MAX1. On the contrary, when the second total count value TOT2 is greater than the first total count value TOT1, the count value of the reference counter CntR is compared with the second maximum count value MAX2. As a result of these comparison operations, if the first or second maximum count value is greater than the reference value, the control unit 450 generates an exposure control rate RATE and an update control signal UPDATE. The exposure control rate RATE is defined as:

$$\text{EXPOSURE CONTROL RATE} = \frac{\text{REFERENCE VALUE}}{(\text{REFERENCE VALUE} + N \times \text{CRITICAL VALUE})}$$

where N is a coefficient of a counter having the maximum count value. For example, if a counter having the maximum count value is CntP(3), the exposure control rate RATE becomes as follows: RATE=(reference value)÷{(reference value)+3×(critical value)}.

The exposure time control signal generation unit 460 generates a next exposure time control signal representing a value obtained by multiplying a current exposure time by the exposure control rate RATE in response to the update control signal UPDATE and an automatic exposure control mode. Further, the next image is captured in response to the calculated next exposure time control signal.

Figure 5B:
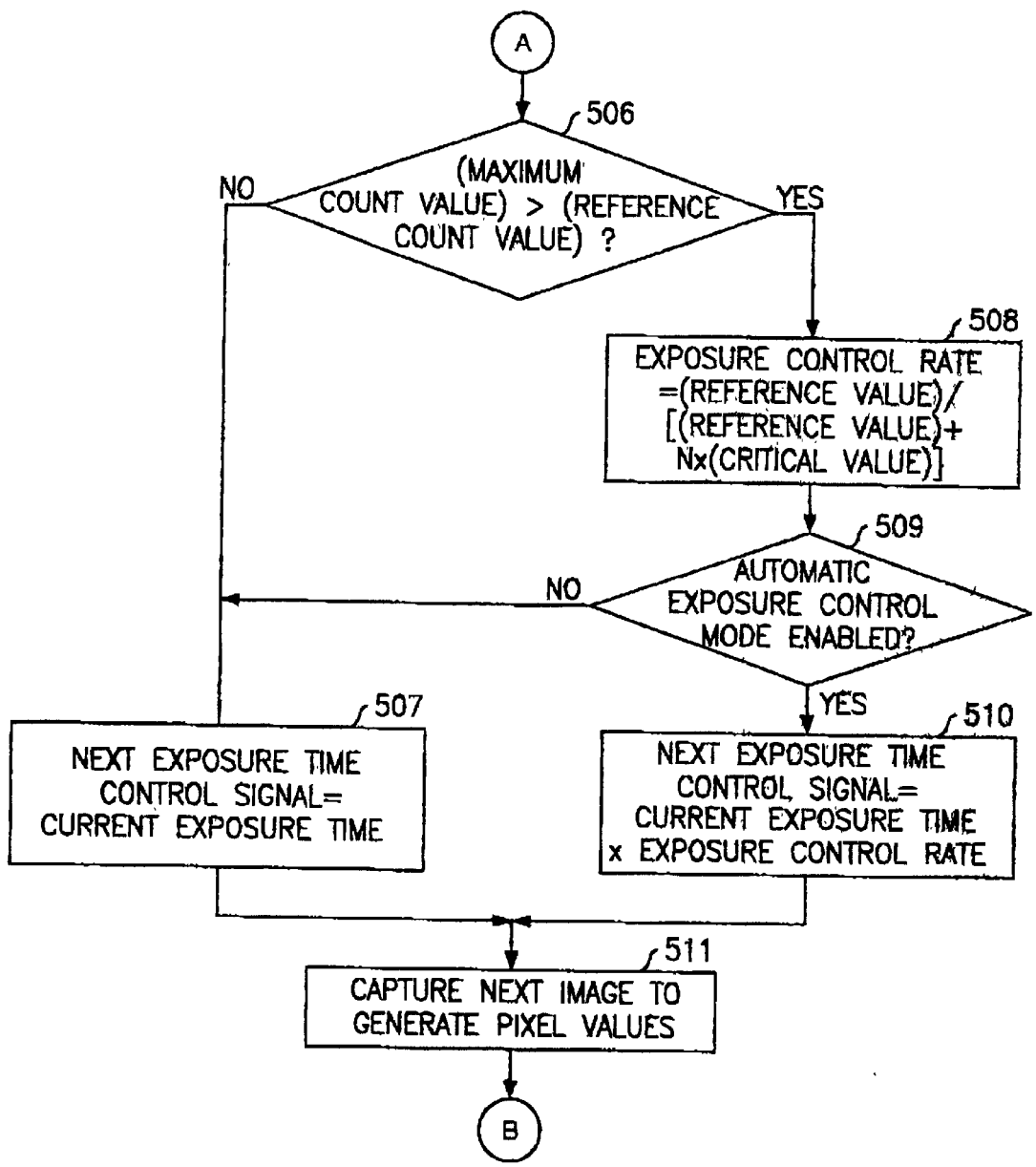

FIGS. 5A and 5B are flow charts for generating a next exposure time according to the present invention.

At a step 500, the pixel array (310, in FIG. 3) captures an image to generate pixel values. Then, at a step 501, the green pixel values are estimated and respective pixels are counted according to predetermined ranges as described in FIG. 4. Then, at a step 502, the green pixels having a pixel value greater than a predetermined reference range are added and compared to generate a first total count value and a first maximum count value, and the green pixels having a pixel value less than a predetermined reference range are added and compared to calculate a second total count value and a second maximum count value. At a step 503, the first total count value is compared with the second total count value. As a result of the comparison, if the second total count value is greater than the first total count value, the second maximum count value is selected at a step 504. If the first total count value is greater than the second total count value, the first maximum count value is selected at a step 505.

Then, at a step 506, the count value of the reference counter is compared with the selected maximum count value. If the count value of the reference counter is greater than the selected maximum count value, a next exposure time is equal to a current exposure time at a step 507. At a step 508, if the selected maximum count value is greater than the count value of the reference counter, the exposure control rate RATE is calculated as follows:

$$\text{EXPOSURE CONTROL RATE} = \frac{\text{REFERENCE VALUE}}{(\text{REFERENCE VALUE} + N \times \text{CRITICAL VALUE})}$$

Then, at a step 509, it is judged as to whether an automatic exposure control mode is enabled. If the automatic exposure control mode is disabled, a value of the next exposure time control signal is equal to a value of the current exposure time. At a step 510, if the automatic exposure control mode is enabled, a value of the next exposure time is calculated by multiplying a value of the current exposure time by the exposure control rate. Thereafter, at a step 511, the next image is captured according to the calculated new exposure time control signal. Then the steps 501 to 511 are repeated until the final completion of capturing image.

While the present invention has been described with respect to certain preferred embodiments only, other modifications and variation may be made without departing from the spirit and scope of the present invention as set forth in the following claims.

What claimed is:

1. An apparatus for automatically controlling an exposure time in a CMOS image sensor, comprising:
    a data estimation means for estimating green pixel values according to respective predetermined ranges to generate count control signals;
    a counting means having a first counter, a second plurality of counters and a third plurality of counters, each for counting green pixels in response to the count control signals;
    a first means for adding and comparing count values from the second plurality of counters to generate a first total count value and a first maximum count value;
    a second means for adding and comparing count values from the third plurality of counters to generate a second total count value and a second maximum count value;
    a control means for comparing a count value of the first counter, the first total count value and the first maximum count value of the second plurality of counters and the second total count value and the second maximum count value of the third plurality of counters to generate an update control signal and an exposure control rate; and
    an exposure time control signal generating means, in response to the exposure control signal and the update control signal, for generating a next exposure time control signal.

2. The apparatus as recited in claim 1, wherein the predetermined reference range is greater than a difference of a reference value and a critical value and smaller than a sum of the reference value and the critical value, where the reference value and the critical value are inputted into the data estimation means and programmed by a user.

3. The apparatus as recited in claim 2, wherein the exposure control rate is calculated as follows:

$$\text{EXPOSURE CONTROL RATE} = \frac{\text{REFERENCE VALUE}}{(\text{REFERENCE VALUE} + N \times \text{CRITICAL VALUE})}$$

where N is a coefficient of the counter having the maximum count value.

4. The apparatus as recited in claim 3, wherein the next exposure time control signal is a value obtained by multiplying a value of a current exposure time control signal by the exposure control rate.

5. A method for automatically controlling an exposure time in a CMOS image sensor, comprising the steps of:
    a) estimating green pixel values and counting green pixels according to respective predetermined ranges;
    b) calculating a first total count value and a first maximum count value of green pixels having pixel values greater than a predetermined reference range and a second total count value and a second maximum count value of the green pixels having pixel values smaller than the predetermined reference range;
    c) comparing the first total count value with the second total count value;
    d) comparing a count value of a reference counter with the first maximum count value if the first total count value is greater than the second total count value, and comparing the count value of the reference counter with the second maximum count value if the second total count value is greater than the first total count value;
    e) capturing a next image according to a current exposure time control signal if the value count value of a reference counter is greater, and calculating an exposure control rate and an exposure time control signal and capturing the next image according to the next exposure time control signal if the count value of a reference counter is smaller; and
    f) repeating the steps a) to e) until the final completion of capturing image.

6. The method as recited in claim 5, wherein the step e) further includes the steps of:
    e1) determining as to whether an exposure control mode is enabled; and
    e2) capturing the next image according to the current exposure time control signal if the exposure control mode is disabled, and capturing the next image according to the next exposure time control signal if the exposure control mode is enabled.

7. The method as recited in claim 5, wherein the predetermined reference range is greater than a difference of a reference value and a critical value and smaller than a sum of the reference value and the critical value, where the reference value and the critical value are programmed by a user.

8. The method as recited in claim 7, wherein the exposure control rate is calculated as follows:

$$\text{EXPOSURE CONTROL RATE} = \frac{\text{REFERENCE VALUE}}{(\text{REFERENCE VALUE} + N \times \text{CRITICAL VALUE})}$$

where N is a coefficient of the counter having the maximum count value.

9. The method as recited in claim 8, wherein the next exposure time control signal is obtained by multiplying a current exposure time by the exposure control rate.

10. The apparatus as recited in claim 1, wherein the counting means includes:
- a reference counter for counting green pixels having pixel values within a predetermined reference range;
- a plurality of second counters, each for counting green pixels having pixel values according to each respective predetermined range which is greater than the predetermined reference range; and
- a plurality of third counters, each for counting green pixels having pixel values according to each respective predetermined range which is smaller than the predetermined range.

* * * * *